United States Patent [19]

Klink

[11] Patent Number: 5,726,540
[45] Date of Patent: Mar. 10, 1998

[54] TRANSIENT ENHANCEMENT CIRCUIT FOR CRT AMPLIFIER

[75] Inventor: Kristopher Klink, San Diego, Calif.

[73] Assignees: Sony Corporation, Tokyo, Japan; Sony Electronics Inc., Park Ridge, N.J.

[21] Appl. No.: 577,356

[22] Filed: Dec. 22, 1995

[51] Int. Cl.$^6$ ............................................. H01J 29/52
[52] U.S. Cl. ................................... 315/383; 348/379
[58] Field of Search ................................. 315/383, 381; 348/379, 673, 674, 675, 678, 679

[56] References Cited

U.S. PATENT DOCUMENTS

| | | | |
|---|---|---|---|
| 4,694,350 | 9/1987 | Hinn | 348/379 |
| 5,400,086 | 3/1995 | Sano et al. | 348/655 X |

*Primary Examiner*—Robert Pascal
*Assistant Examiner*—Justin P. Bettendorf
*Attorney, Agent, or Firm*—Lise A. Rode, Esq.; Jerry A. Miller

[57] ABSTRACT

A transient improvement circuit is disclosed for cathode ray tube (CRT) amplifiers with automatic kinescope bias feedback circuits. An NPN transistor and a PNP transistor are provided, each having a collector, an emitter and a base. A video input signal is applied to the base of the NPN transistor. A first collector resistor is connected between the collector of the NPN transistor and a power supply voltage, the collector of the NPN transistor also being connected to the base of the PNP transistor. A first emitter resistor is connected between the emitter of the NPN transistor and ground, and the first emitter resistor has, connected in parallel therewith, a filter capacitor and a second emitter resistor connected in series with the filter capacitor. A third emitter resistor, having a first end and a second end, is also provided, wherein the first end is connected to the emitter of the PNP transistor and a forward-biased diode and a first capacitor are connected, in parallel, across the base of the PNP transistor and the second end of the third emitter resistor. A second collector resistor is connected between the collector of the PNP transistor and ground and an output resistor is connected to the second end of the third emitter resistor and is output to the drive a cathode. The circuit provides a CRT amplifier with symmetrical rise and fall transitions, radio frequency emissions are reduced on black-to-white edges, pre-shoot and overshoot levels are equal without signal warping in the luminance processor and gamma correction is reduced or eliminated.

6 Claims, 7 Drawing Sheets

FIG. 1 (PRIOR ART)

Set Up

C-Board Mod.

TRANSIENT ENHANCEMENT CIRCUIT FOR CRT AMPLIFIER

BACKGROUND OF THE INVENTION

1. Field of the Invention

The invention pertains to a transient enhancement circuit for a cathode-ray-tube (CRT) amplifier. More particularly, the invention pertains to an electronic circuit design for high-speed CRT amplifiers with automatic kinescope bias feedback.

2. General Background

As is well known to those skilled in the related arts, a CRT display apparatus contains an electron gun or guns. A visual display is created on a phosphorescent screen by a CRT by scanning one or more electron beams across the screen to selectively illuminate picture elements (pixels) on the screen, thereby creating a desired display pattern. A color CRT has three electron guns, corresponding to the colors red, green and blue. The combination of the three primary colors in different ratios on any given pixel can create any color in the visible spectrum.

The picture quality for cathode-ray-tubes is dependent upon many factors, including amplifier design, noise reduction, frequency response, non-linear processing, geometric linearity and automatic kinescope bias (AKB), which compensates for changes in the cut-off voltage of a CRT, i.e. it is a method of keeping the tube black level constant regardless of temperature and aging. The requirement for AKB has placed an additional burden on CRT amplifier design in order to produce sampled cathode current without substantially increasing the circuit cost and degrading signal performance. An amplifier design which is currently known to those skilled in the art uses a configuration which is a compromise between previous picture quality and cost, but produces transient artifacts such as unsymmetrical pre/overshoots, on-screen display shadows, horizontal variations in luminousity, and over-modulated beam currents on black-to-white transitions.

Figure 1:
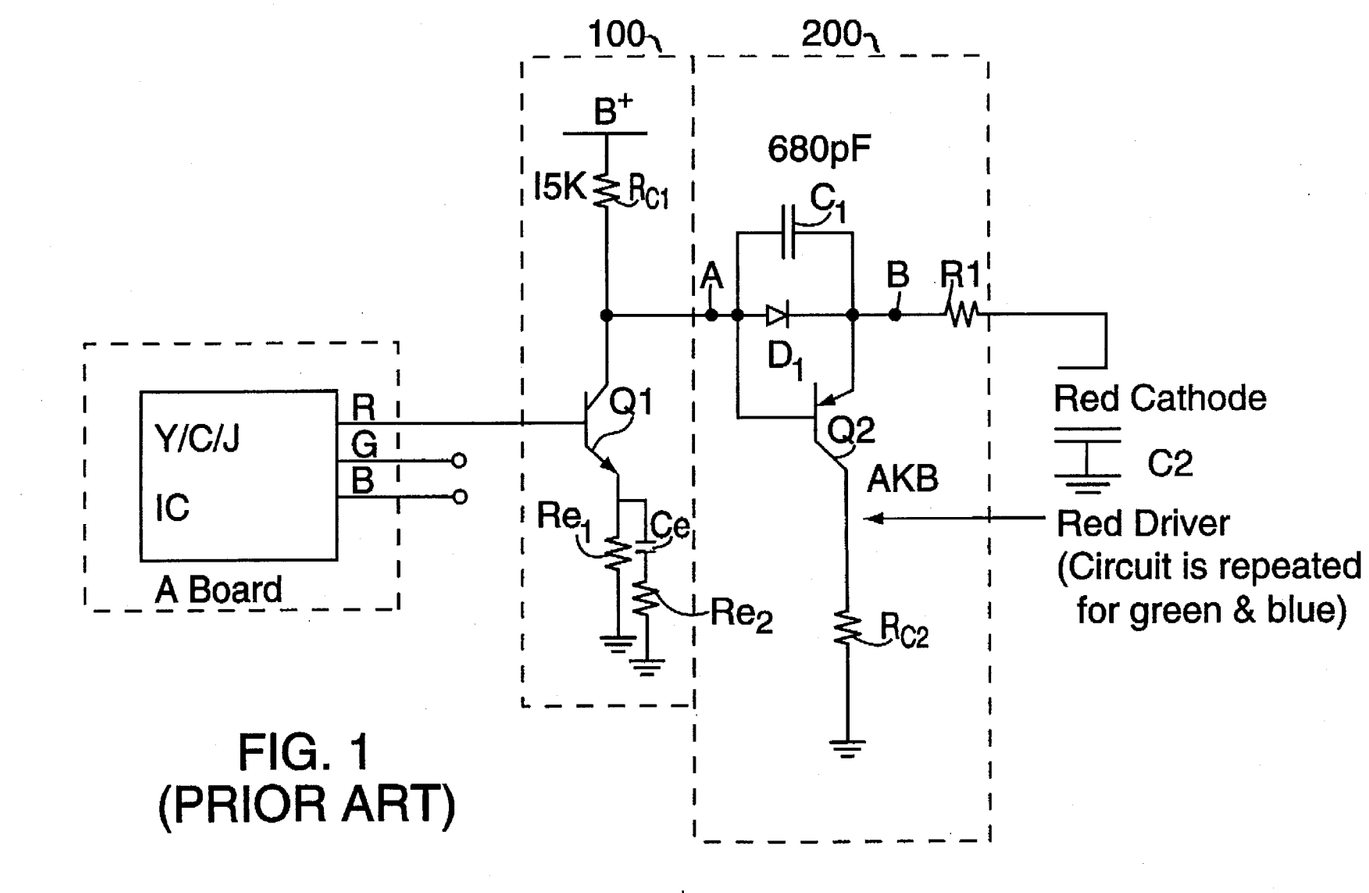
FIG. 1 is a schematic diagram of a known CRT amplifier circuit.

The circuit shown in FIG. 1 illustrates a known amplifier design wherein a diode D1 and a transistor Q2 are added to a CRT driver (transistor Q1, collector resistor $R_c$, emitter resistor $R_E$ and emitter capacitor $C_E$), so as to add AKB. However, adding the Q2, D1, C1 and R1 circuit to the CRT driver causes the symmetry of the transient response to be skewed somewhat, wherein transitions from black-to-white are very fast, very sharp and have a lot of overshoot, while the transitions from white-to-black are very slow and do not have extensive overshoot. These unsymmetrical transient responses are contradictory to the desired response of the circuit.

Therefore, it is an object of the present invention to provide a CRT amplifier with symmetrical rise and fall transitions.

It is a further object of the present invention to provide a CRT amplifier in which radio frequency emissions are reduced on black-to-white edges.

It is a still further object of the present invention that pre-shoot and overshoot levels become equal without signal warping in the luminance processor and that gamma correction can be reduced or eliminated.

Finally, it is an object of the present invention to make the overshoot and the rise times at the edges the same for both black-to-white transitions and white-to-black transitions.

These and other objects, advantages and features of the invention will become apparent to those skilled in the art upon consideration of the following description of the invention.

SUMMARY OF THE INVENTION

In one embodiment of the present invention, a transient improvement circuit, for cathode ray tube (CRT) amplifiers with automatic kinescope bias feedback circuits, includes a source of a video signal, an NPN transistor and a PNP transistor, each having a collector, an emitter and a base, wherein the video signal is applied to the base of the NPN transistor.

A first collector resistor is connected between the collector of the NPN transistor and an applied potential (a power supply voltage), the collector of the NPN transistor also being connected to the base of the PNP transistor. A first emitter resistor is connected between the emitter of the NPN transistor and ground, and the first emitter resistor has, connected in parallel with that resistor, a peaking capacitor and a second emitter resistor connected in series with the filter capacitor.

A third emitter resistor, having a first end and a second end, has the first end connected to the emitter of the PNP transistor and, a forward-biased diode and a first capacitor are connected, in parallel, across the base of the PNP transistor and the second end of the third emitter resistor. A second collector resistor is connected between the collector of the PNP transistor and ground and an output resistor is connected to the second end of the third emitter resistor, and is output to the drive a cathode.

In the preferred embodiment of the invention, the first collector resistor has a value of 15KΩ, the third emitter resistor has a value of 1KΩ0 and the first capacitor has a value of 220 pF.

A second embodiment of the invention, described in further detail below, replaces the signal NPN transistor of the first embodiment with a cascode CRT amplifier, and, together with the same AKB feedback circuit described above, provides the same advantages and objectives as those achieved by the first embodiment.

The features of the invention believed to be novel are set forth with particularity in the appended claims. The invention itself however, both as to organization and method of operation, together with further objects and advantages thereof, may be best understood by reference to the following description taken in conjunction with the accompanying drawings.

DETAILED DESCRIPTION OF THE INVENTION

While this invention is susceptible of embodiments in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawing.

FIG. 1 shows a schematic diagram of a known CRT amplifier circuit with AKB. Only the red (R) color channel, of the red (R), green (G) and blue (B) color channels, is shown for simplicity. However, the use of the same arrangement for each of the three color channels is represented in FIG. 1 by the designation "R, G, B". First, the Y/C/J IC (i.e. the "luma chroma jungle" IC, which is a video processing IC) outputs a voltage drive output representing the red (R), green (G) and blue (B) color video signals. The red video signal is coupled to an amplifier 100 (outlined in phantom), which is a "class A amplifier", into the base of NPN transistor Q1. The amplifier has some emitter peaking, therefore, there is a resistor $R_{E1}$ (for biasing reasons) off the emitter of transistor Q1 and an emitter bypass capacitor $C_E$ (for signal amplification purposes to shunt resistor $R_{E1}$ so that the signal current can flow down to ground without producing a signal voltage drop leading to negative feedback, as does the bias current), both of which go to ground. Also, there is a 15K load resistor $R_{C1}$ off the collector of Q1.

The collector output of Q1 (i.e. the output of amplifier 100) is coupled via the AKB current sensing network 200 (also outlined in phantom) and via a resistor R1, to a connector (not shown) for connection to the red cathode of the CRT. Accordingly, the collector of Q1 is connected to the base of a PNP transistor Q2. A forward-biased diode D1 is connected between the emitter and the base of Q2 (i.e. the anode terminal of D1 is connected to the base and the cathode terminal of D1 is connected to the emitter) and a capacitor C1 is connected in parallel to the diode D1. A resistor $R_{C2}$ couples the Q2 collector to ground. The AKB network 200 senses output current flow which may be used by AKB control circuitry (not shown). As noted above, the emitter output of Q2 is connected in series to resistor R1 which is connected to the cathode (in this example, the "red" cathode is shown, however, the same amplifier circuit would be duplicated for the green and blue cathodes). In addition, there is a capacitor C2 from the red cathode to ground. We will assume that the amplifier has a gain of approximately 100.

First, the circuit shown in FIG. 1 will be analyzed for a "black-to-white" transition. Assume, for example, that a black-to-white transition at the red output would be a transition that goes from 3 volts to 5 volts—black being 3 volts and white being 5 volts. If you look at the collector of Q1, black would be at, for example, 150 volts and white would be at, again for example, 50 volts. In the configuration of the circuit when the collector of Q1 goes low, i.e., when it starts at 150 volts (i.e. black) and tries to go down to 50 volts (i.e. white), the diode D1 will turn off and PNP transistor Q2 will turn on. The reason for this is because the capacitor C1, between the base and the emitter of Q2, across the diode D1, will hold the charge on the emitter side of Q2 higher as the collector of Q1 goes low. Since the emitter of Q2 is higher, the base will turn on the base-emitter junction, i.e. Q2 turns on, and acts as a low impedance source to drive the red cathode.

Figure 2:
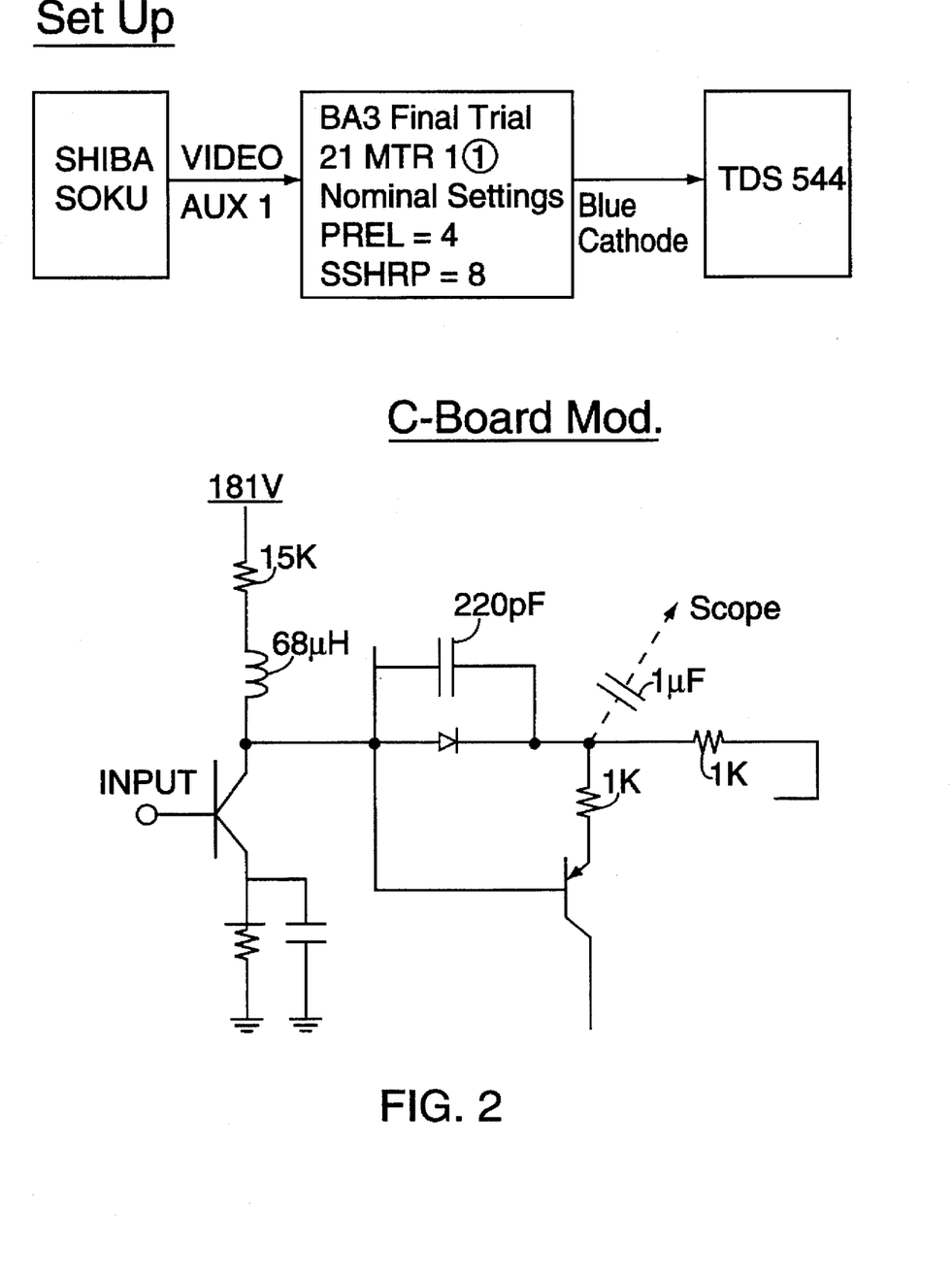
FIG. 2 is a block diagram showing the circuit set-up for the CRT amplifier circuit shown in FIGS. 1 and 5 and the oscilloscope connection to achieve the transient responses shown in FIGS. 3 and 6 (note that the oscilloscope connection is shown for the circuit of FIG. 6, as an illustration, and that FIG. 1 would be connected similarly).

In a black-to-white transition situation as described in detail above, transistor Q2 can be thought of as being a very low impedance resistor pulling the red cathode low, and since there is the capacitor C2 from the red cathode to ground, the resistor R1, going to the red cathode, and the capacitor C2, going to ground, act as a low pass filter. There is a low impedance source Q2 pulling down the series resistor R1 and the red cathode capacitor C2. Therefore, the transition from black-to-white is based on the series resistor R1 (which, for example, is a 1K resistor), and, the red cathode capacitor C2 (which, for example, is approximately a 6 pF capacitor) from the red cathode to ground. As is clearly shown in FIG. 3, i.e. the transient response of the amplifier circuit shown in FIG. 1, the black-to-white transition is a fast and sharp transition with a lot of overshoot. The example circuit set-up, as illustrated in FIG. 2, includes a Shiba-Soku 250 Khz square wave generator, the output of which is input to a TV (for example in this case, the Sony "BA-3 21MTR1"), and the blue cathode output of the TV is input to an oscilloscope (in this case, the "TDS 544"). The points of measurement for signals "A" and "B"0 (illustrated in the transient response shown in FIG. 3), are clearly indicated in the circuit setup in FIG. 2. FIG. 2 also illustrates a 1 µF capacitor load which connects the output of the circuit to the oscilloscope. Signal A is an amplified signal measured at the collector output of transistor Q1 (i.e. the output of amplifier circuit 100). It is clear from FIG. 3 that a black-to-white transition for signal B, measured at the emitter output of transistor Q2, is very fast and has a large overshoot from signal A. This overshoot in signal B can be seen on images which have dark to light transitions, such as a background scene to flesh, and the resulting image will appear to have an undesirable "glow" or "ring" on one edge. Although this effect can be minimized by reducing the overall picture sharpness, the perceived picture quality will also be reduced.

Figure 3:
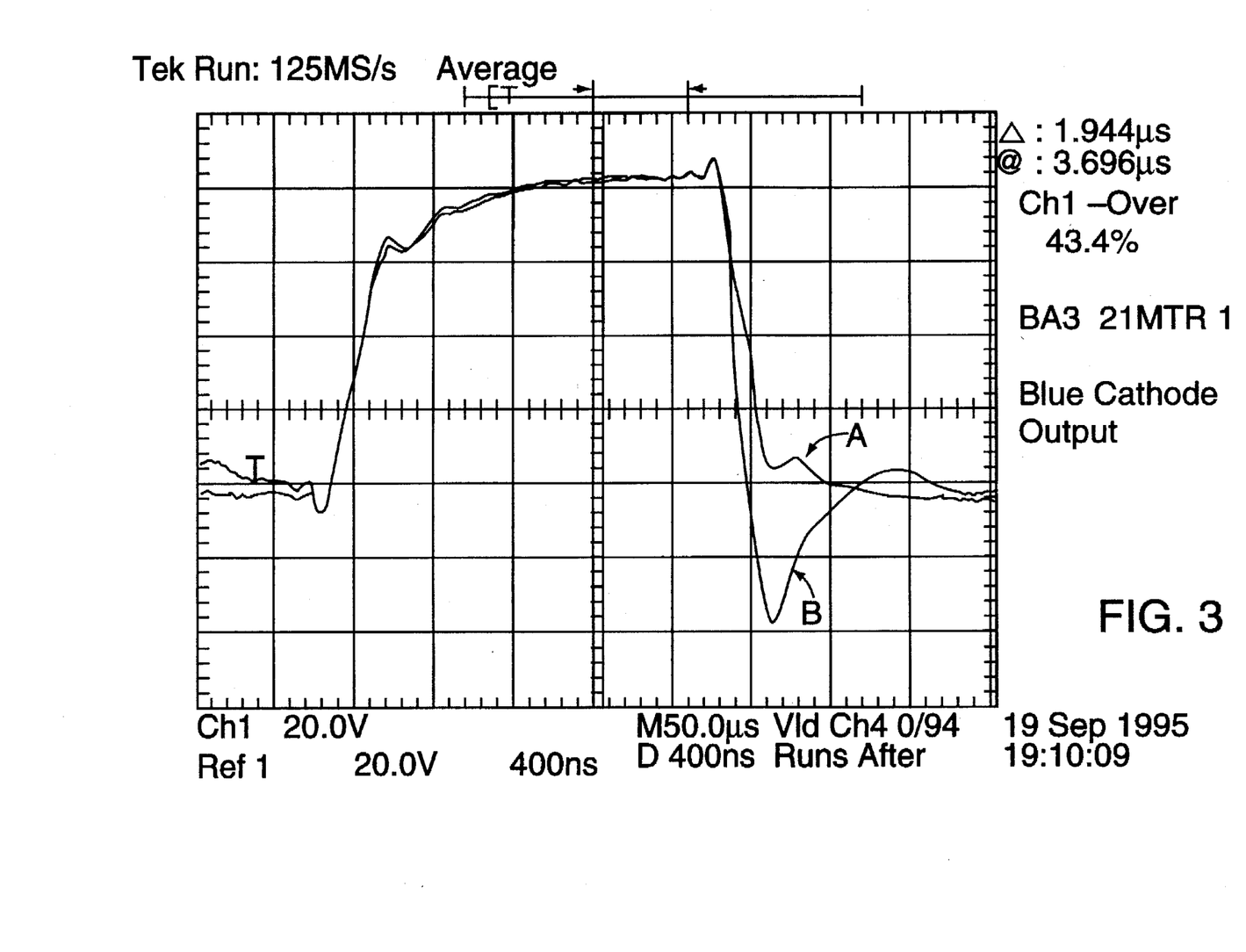
FIG. 3 is an illustration of a transient response of the CRT amplifier circuit shown in FIG. 1 and clearly shows the transient response artifacts in the overshoot in signal B.

Although, as described above, the black-to-white transition is a fast and sharp transition with a lot of overshoot, a reverse transition, i.e., a white-to-black transition (for the reasons described in detail immediately following), is a slow transition with little or no overshoot (as is also shown in FIG. 3).

In the white-to-black transition, the red outputs at, for example, 5 volts (white) and it goes down to, again for example, 3 volts (black), i.e., the collector of Q1 is going to start at 50 volts (white) and go up to 150 volts (black). In this situation, the same capacitor (C1 ), across the emitter and base of Q2, will hold the Q2 emitter low as the collector of Q1 goes high, which turns the diode D1 on and the transistor Q2 off.

Accordingly, in a low-pass filter configuration of the circuit shown in FIG. 1 (in a white-to-black transition), there is a 15K resistor ($R_{C1}$) in series with 1K resistor (R1) and with a 6 pF capacitor (C2) to ground on the red cathode. Therefore, since the 15K resistor is added to the 1K resistor, the frequency of the low-pass filter is much lower, causing significant problems with respect to the imbalance obtained with this type of amplifier.

An additional problem raised by the known CRT amplifier shown in FIG. 1 relates to the current through the tube itself.

As the tube is driven harder, i.e., as the collector of Q1 goes lower, the beam current that comes from the red cathode goes up exponentially (the "gamma", which essentially refers to the relationship between the light input to a camera and the signal output from a picture tube). Accordingly, that current (the beam current will flow through the resistors, i.e., any series resistors (in this case, the 15K resistor $R_{C1}$ and the 1K resistor R1) and cause an exponential voltage drop across such resistors. Therefore, without pnp transistor Q2 and diode D1 in the circuit, some gamma correction takes place, because of the 15K resistor $R_{C1}$. The reason that this correction occurs is that as the collector of transistor Q1 goes lower, there is bias current, on the order of 2-3 mA, through Q1. As the collector of transistor Q1 goes lower, more bias current will come from the red cathode, possibly on the order of 1 mA, which will cause the collector voltage to not go as low during black-to-white transitions, which illustrates "gamma correction" (i.e., the dark portions will become more visible, without the bright portions looking "washed-out"). If the 15K resistor $R_{C1}$ was very small there would be almost no gamma correction because there would be so much current going through transistor Q1, that when the additional 1 mA of current was added, there would be almost no difference.

Figure 4:
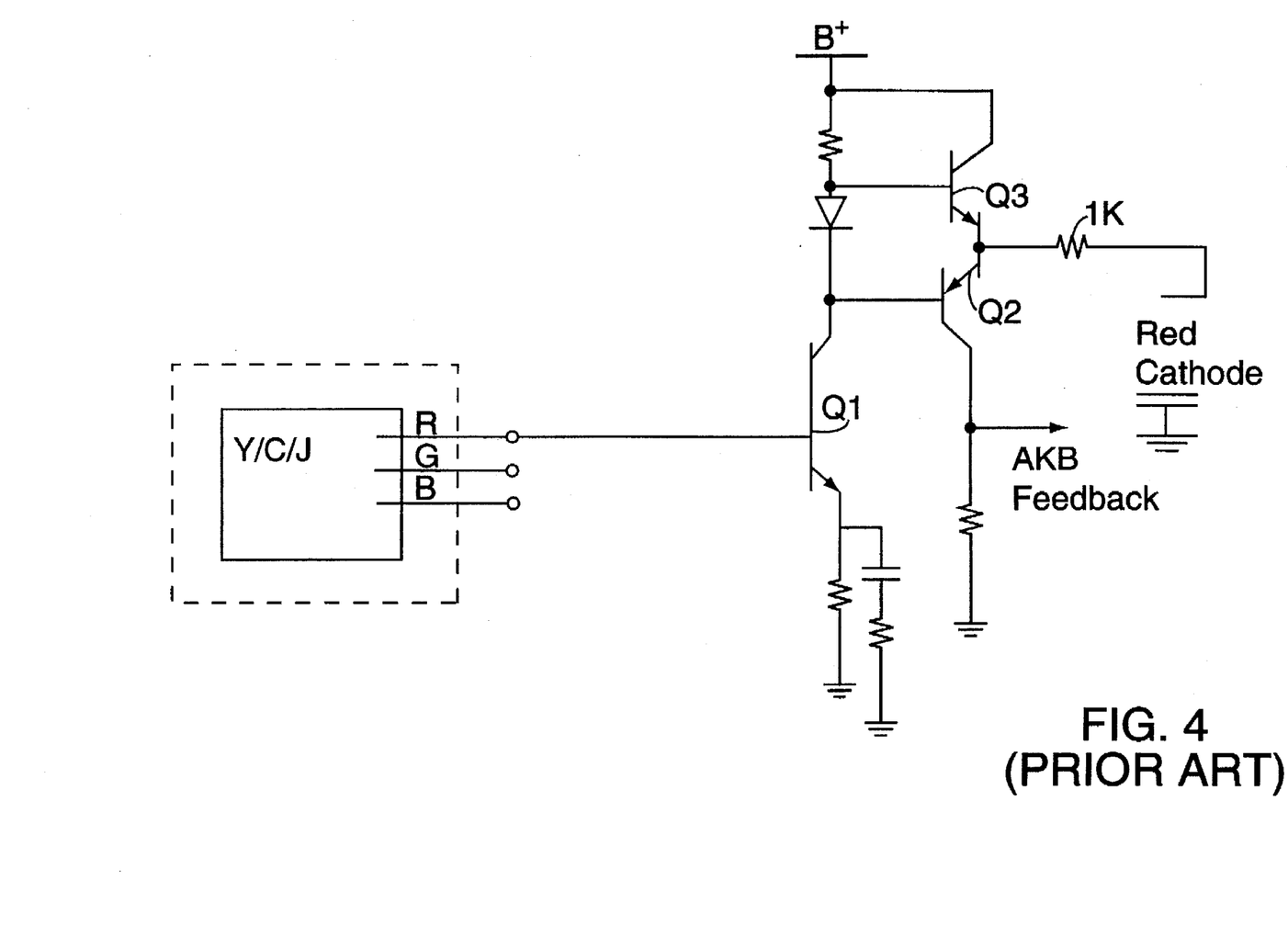
FIG. 4 is a schematic diagram of a conventional CRT amplifier in which a complimentary transistor Q3 is added to Q2 to provide a low impedance source to the cathode.

Another known CRT amplifier circuit, which attempts to correct the problems described above with respect to the circuit shown in FIG. 1, is shown in FIG. 4. In this circuit, a complimentary transistor Q3 has been added and provides a low impedance source to the red cathode for both positive and negative transitions. Essentially, the transistors Q2 and Q3 are "push-pull" connected such that Q3 conducts on positive swings, and Q2 on negative swings (i.e., this is a "class B amplifier", or, each transistor conducts over half of the cycle). This type of circuit is used in high performance CRT amplifiers with AKB feedback, where both cost and board space are not as critical.

Figure 5:
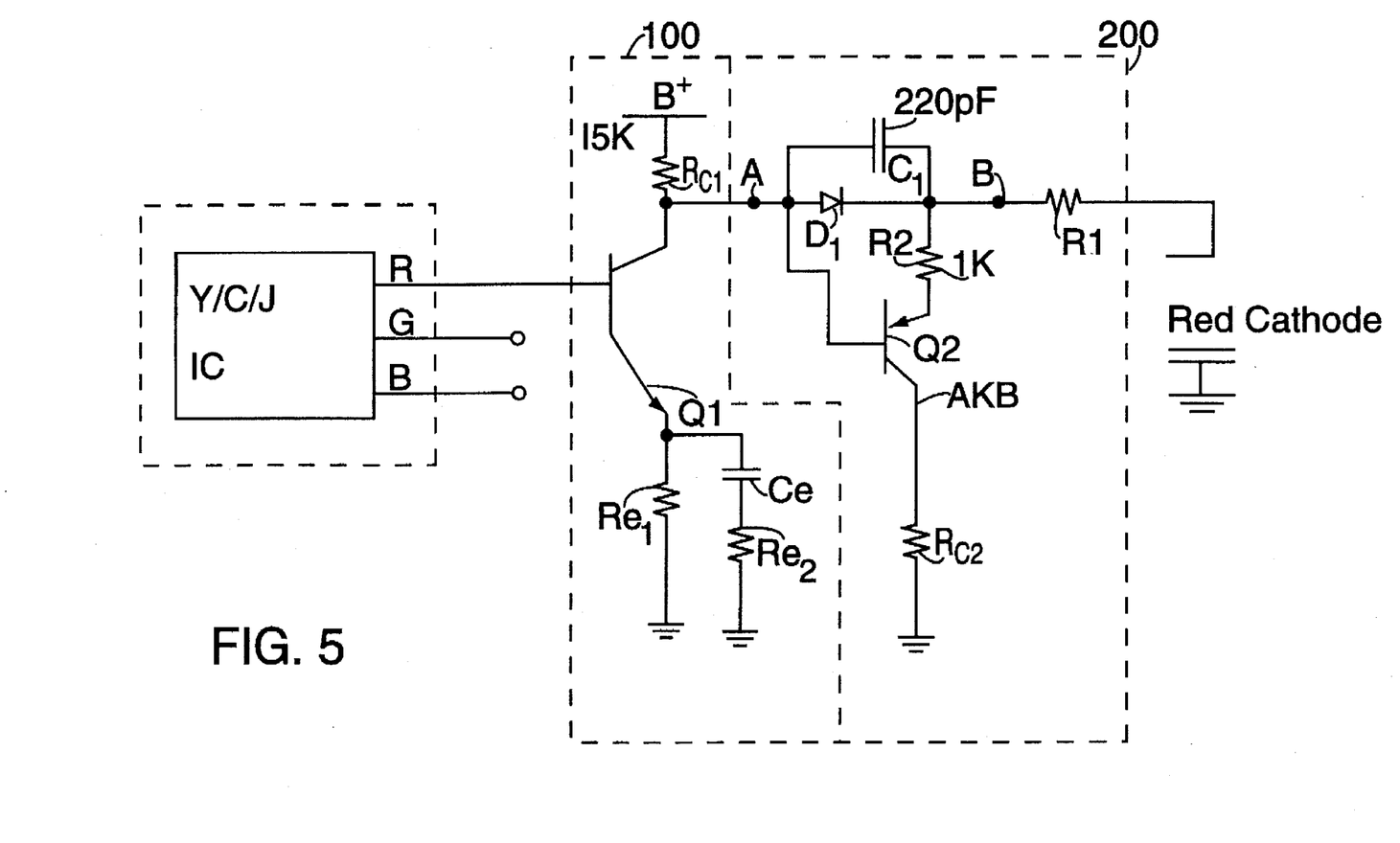
FIG. 5 is a schematic diagram of a CRT amplifier circuit according to a first preferred embodiment the present invention.

However, obviously in many situations cost and board space are critical factors and in those situations, FIG. 5 is a schematic diagram of a CRT amplifier circuit according to a preferred embodiment the present invention which takes cost and space into consideration. The amplifier circuit shown in FIG. 5 is the same as that shown in FIG. 1, with resistor R2 (shown as a 1K resistor, which is the preferred embodiment resistance value) added to the circuit between the emitter of Q2 and cathode end of the diode D1 (which is connected in parallel with capacitor, C1, which has a preferred embodiment value of 220 pF ). In the preferred embodiment, when the transition goes from black-to-white, there is a 1K resistor R2 that will cause a voltage drop across it as the beam current increases. The 1K resistor R2 will actually react the same way as the 15K load resistor $R_{C1}$ reacts in a white-to-black transition, providing for gamma correction in both directions (black-to-white and white-to-black). Accordingly, symmetrical peaking is enhanced by the addition of R2 in two ways—(1) the output impedance of the pull-down transistor Q2 is increased to resemble the impedance of the pull-up transistor Q1, and (2) gamma correction for black-to-white transitions is increased to match that of white-to-black transitions.

Figure 6:
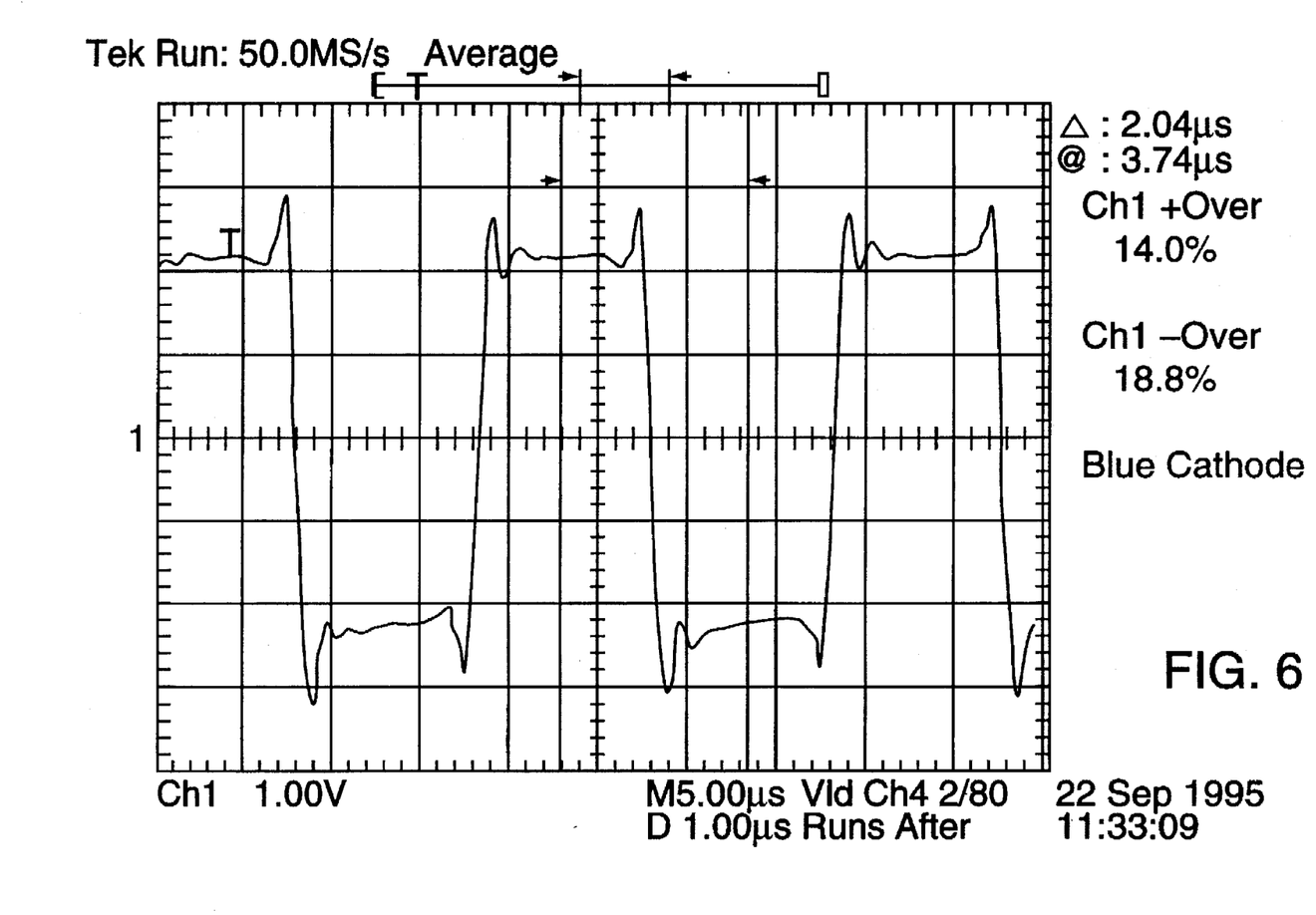
FIG. 6 is an illustration of a transient response of the amplifier circuit shown in FIG. 5.

The fact that gamma correction is provided in both directions, is just one of the items that is unique about a circuit according to the present invention—another is that by adding the 1K resistor R1 in the emitter of Q2, the transitions going from white-to-black and black-to-white will be more symmetrical and balanced. The reason for this is that instead of having a low impedance source Q2 pulling down the 1K resistor R1 and the 6 pF capacitor C2 as in the known circuit of FIG. 1, in the circuit according to the present invention (shown in FIG. 5) there is 2K resistance, which essentially moves the pole out twice as far. As shown in the transient response of the preferred embodiment, illustrated in FIG. 6, the claimed transient improvement circuit according to the present invention provides a CRT amplifier with symmetrical rise and fall transitions, reduces radio frequency emissions on black-to-white edges, equalizes pre-shoot and overshoot levels without signal warping in the luminance processor and reduces (if not eliminating) gamma correction. Accordingly, the addition of just one chip resistors to the known amplifier design provides the desired response with only minimal additional cost.

Figure 7:
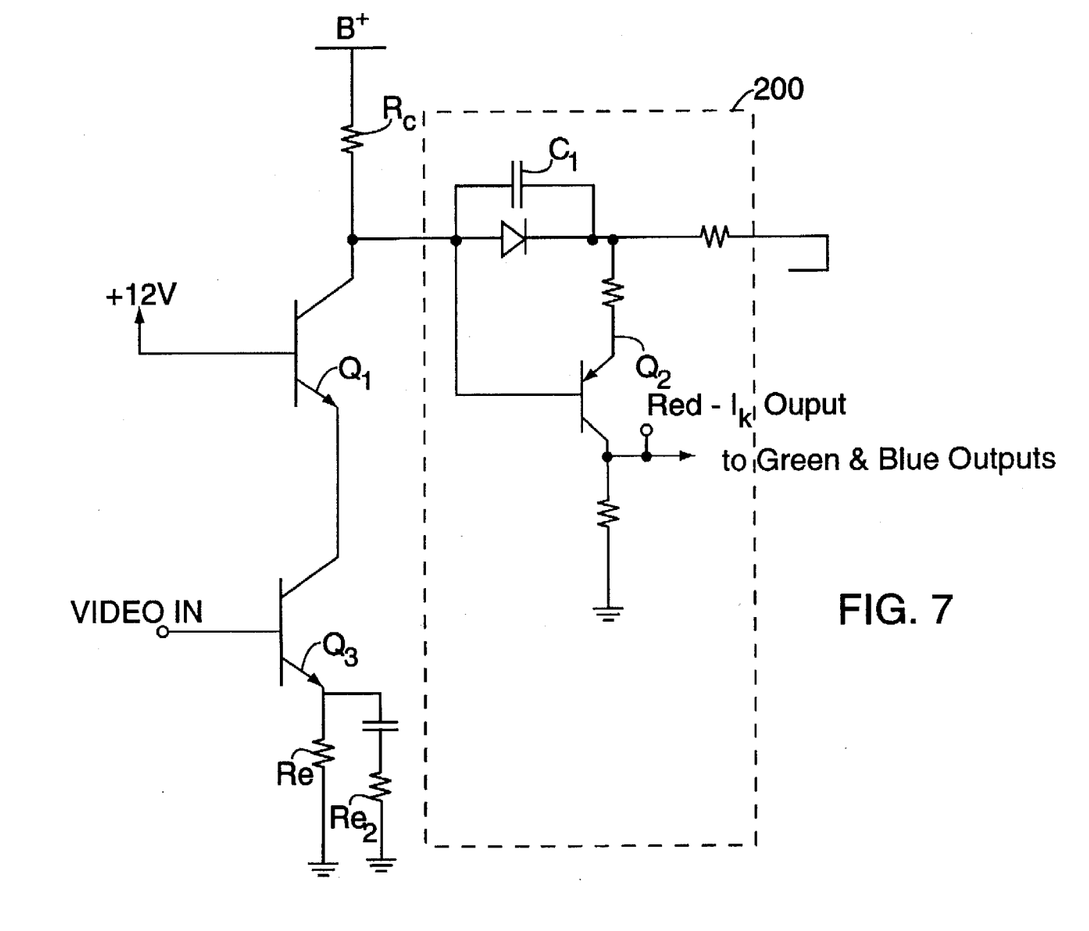
FIG. 7 is a schematic diagram of a CRT amplifier circuit according to a second preferred embodiment of the present invention.

The second preferred embodiment of a CRT amplifier according to the present invention is illustrated in FIG. 7, and provides a cascode configuration CRT amplifier with the same AKB circuit as illustrated in FIG. 5. In the cascode configuration, Q3 is a grounded emitter amplifier with $R_L$ as the collector resistor. Q1 is interposed in the Q3 collector path to prevent Q3's collector from "swinging" while passing the collector current through to the load resistor unchanged. Q1's base voltage is a fixed bias voltage which is set slightly above Q3's emitter voltage to maintain Q3 in the active region. As in the circuit of FIG. 5, the collector output of Q1 is connected to the base of a PNP transistor Q2. The AKB network 200 is identical to that shown in FIG. 5. It should be noted for all the embodiments disclosed herein that although the above analysis may suggest making the added emitter resistor $R_{E2}$ a "15K" resistor, so that it is identical to $R_{C1}$, i.e., making the collector resistor (or the "pull-up resistor") of Q1 identical to $R_{E2}$ the emitter resistor (or the "pull-down" resistor) of Q2, if you make $R_{E2}$ too large, the capacitor C1, across the diode D1, causes some storage effects with the tube which actually rolls off the frequency response entirely too much. Therefore, a preferred embodiment of the invention is directed to the values shown for $R_{C1}$ (15K), and both $R_{E2}$ (1K) and C1 (220 pF), which are critical for ideal operation so as to obtain a symmetrical response. However, it should be noted that the values of C1 and $R_{E2}$ can vary, provided that there is a balance that makes the overall response symmetrical (the variation of $R_{E2}$ will change gamma correction requirements, and the variation of C1 will alter rise/fall time transients, according to a desired response).

Thus it is apparent that in accordance with the present invention, an apparatus that fully satisfies the objectives, aims and advantages is set forth above. While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. A transient improvement circuit, for cathode ray tube (CRT) amplifiers with automatic kinescope bias feedback circuits, comprising:

an NPN transistor and a PNP transistor, each having a collector, an emitter and a base, wherein a video input signal is applied to the base of said NPN transistor;

a first collector resistor connected between the collector of said NPN transistor and a power supply voltage, the collector of said NPN transistor also being connected to the base of said PNP transistor;

a first emitter resistor connected between the emitter of said NPN transistor and ground, wherein said first emitter resistor has, connected in parallel with said first emitter resistor, a filter capacitor and a second emitter resistor connected in series with said filter capacitor;

a third emitter resistor, having a first end and a second end, wherein the first end is connected to the emitter of said PNP transistor and, wherein a forward-biased diode and a first capacitor are connected, in parallel, across the base of said PNP transistor and the second end of said third emitter resistor;

a second collector resistor connected between the collector of said PNP transistor and ground; and an output resistor connected to the second end of said third emitter resistor, said output resistor providing an output to drive a cathode.

2. A transient improvement circuit according to claim 1, wherein the first collector resistor has a value of 15 KΩ, the third emitter resistor has a value of 1 KΩ, and the first capacitor has a value of 220 pF.

3. A transient improvement circuit according to claim 2, wherein the output resistor has a value of 1 KΩ.

4. A transient improvement circuit, for cathode ray tube (CRT) amplifiers with automatic kinescope bias feedback circuits, comprising:

a source of a video signal;

cascode amplifier means for amplifying a relatively low level video signal, received from said source at an input of said cascode amplifier means, to produce a relatively high level video signal at an output of said amplifier means; and a PNP transistor having a collector, an emitter and a base, wherein the output of said cascode amplifier means is directly input to the base of said PNP transistor, wherein an emitter resistor, having a first end and a second end, has the first end connected to the emitter of said PNP transistor and, wherein a forward-biased diode and a capacitor are connected, in parallel, across the base of said PNP transistor and the second end of said emitter resistor, wherein a collector resistor is connected between the collector of said PNP transistor and ground, and wherein an output resistor is connected to the second end of said emitter resistor, said output resistor providing an output to drive a cathode.

5. A transient improvement circuit according to claim 4, wherein a collector resistor of said cascode amplifier has a value of 15 KΩ, the emitter resistor has a value of 1 KΩ, and the capacitor has a value of 220 pF.

6. A transient improvement circuit according to claim 5, wherein the output resistor has a value of 1 KΩ.

* * * * *